United States Patent

[11] 3,553,446

[72] Inventor Joseph F. Kruy
West Newton, Mass.
[21] Appl. No. 570,223
[22] Filed Aug. 4, 1966
[45] Patented Jan. 5, 1971
[73] Assignee Honeywell Inc.
Minneapolis, Minn.
a corporation of Delaware

[54] CARRY DETERMINATION LOGIC
9 Claims, 7 Drawing Figs.

[52] U.S. Cl. .......... 235/175, 307/206, 307/207
[51] Int. Cl. .......... G06f 7/50, H03k 19/10
[50] Field of Search .......... 235/176, 175; 307/206, 207

[56] References Cited
UNITED STATES PATENTS

| | | | |
|---|---|---|---|
| 3,100,835 | 8/1963 | Bedrij .......... | 235/175 |
| 3,316,393 | 4/1967 | Ruthazer .......... | 235/175 |
| 3,329,835 | 7/1967 | D'Agostino .......... | 307/207(X) |
| 3,387,298 | 6/1968 | Kruy et al. .......... | 307/206 |

*Primary Examiner*—Eugene G. Botz
*Attorneys*—Henry L. Hanson, Robert J. Zinn and Fred Jacob

ABSTRACT: Carry determination logic for use in a conditional sum adder is constructed using high-speed tunnel diode circuitry connected with current switching circuitry for generating decision signals within one logical time unit.

INVENTOR
JOSEPH F. KRUY

BY Robert J. Zinn
ATTORNEY

INVENTOR
JOSEPH F. KRUY
BY Robert J. Zinn
ATTORNEY

INVENTOR
JOSEPH F. KRUY

BY Robert J. Zinn
ATTORNEY

INVENTOR
JOSEPH F. KRUY
BY Robert J. Zinn
ATTORNEY

CARRY DETERMINATION LOGIC

The present invention relates to carry determination logic and circuitry for effecting the expression thereof. In particular, the present invention discloses an optimal form of carry determination logic such as may be utilized in the carry determination portion of a conditional sum adder.

The conditional sum adder represents a well-known technique, having first been described by J. Sklansky, in a paper entitled "Conditional Sum Addition Logic" which appeared in Volume EC–9 of the IRE Transactions on Electronic Computers, Jun. 1960, and particularly at pages 226 through 231 thereof. A conditional sum adder also forms the subject matter of U. S. Pat. No. 3,100,835 which issued to O. J. Bedrij on Aug. 13, 1963. The latter arrangement, although having the speed advantages inherent in a conditional sum adder, is of limited use because of the pyramidal type of logical organization employed. This arrangement results in the expenditure of portionately larger amounts of hardware as the size of the unit is expanded to accommodate increasingly larger operands. In addition, both of the above representations have speed limitations due to the use of majority and logic in the implementation thereof.

Accordingly, it is a primary object of the present invention to provide an improved form of carry determination logic.

It is a further object of the present invention to provide a more efficient version of a conditional sum adder including means for implementing the carry determination portion thereof, which means necessitate a minimum of time in the generation of carry signals therein.

The conditional sum method of performing addition involves the generation of conditional sums and/or carries on corresponding bits of augend and addend operands, first on the assumption that a carry is to be propagated from the preceding stage and again on the assumption that no carry is to be propagated from the preceding stage. The resulting conditional sums and/or carries represent the assumption of all possible distributions of carries for the corresponding bits of the addend and augend operands. The true sum for each bit position is established by selecting the appropriate carry from among the conditional sums and carries in accordance with the carry actually propagated from the immediately preceding bit position.

In the conditional sum adder to be further described herein, a carry signal is propagated serially in two logically different paths. One of the two paths involves the generation of the two possible carries for each binary stage while the other path enables the performance of the carry bypass and selection logic functions. The serial propagation of carry signals necessitates the use of particularly fast circuitry. The fastest available digital circuits in use today incorporate tunnel diodes connected in integrated circuit configurations. In accordance with the circuitry considerations of the present invention, the superior operating speeds of the tunnel diode are preserved by effectively isolating it from the time limiting capacitive reactance represented by the input portion of the tunnel diode switching circuitry.

Accordingly, it is a further object of the present invention to provide a high-speed logic circuit having tunnel diodes connected therein in a manner to insure high-speed operation.

Another more specific object of the present invention is to provide a high-speed logic circuit using tunnel diodes and including means to capacitively isolate the tunnel diode from the input portion of the circuit.

Conventional approaches directed to the implementation of carry determination circuits are known which utilize majority logic techniques in the representation thereof. An example of a carry circuit operative in the majority logic mode is disclosed in U. S. Pat. No. 3,243,584 which issued to the present inventor on Mar. 29, 1966. Also representative of a conventional approach to the implementation of a carry generating circuit is U. S. Pat. No. 3,084,861, which issued to A. W. Roberts Apr. 9, 1963.

The above-mentioned examples of carry determination logic all share a common disadvantage in regards to efficiency of implementation with conventional circuitry. More specifically, applicant has recognized that the acceptance or rejection of the design of conventional carry circuits often occurs on the logical level with little or no consideration being given to the practicality of its implementation with conventional circuitry. Thus, it is often true that for a given majority logic circuit, the required component tolerances will be higher, and the operating margins poorer than those experienced with the present arrangement.

It is thus another object of the present invention to provide the logic organization for a carry-generating circuit which exhibits a faster operating time along with a more efficient utilization of circuit elements.

In addition to performing the carry determination operation, the circuitry utilized to establish the logical relationships can be readily expanded to serve a broader more universal function.

Accordingly, another object of the present invention is the provision of a high-speed electronic computing apparatus having logical elements therein capable of serving as universal building blocks from whence almost any type of high-speed digital computing electronic system may be constructed.

The various novel features which characterize the present invention are particularly pointed out in the claims annexed to and forming a part of the specification. For a better understanding of the invention, its advantages and specific objects, reference should be made to the following detailed description and the accompanying drawings in which:

The theory of operation of a conditional sum adder is based on the computation of conditional sums and carries resulting from the assumption of all possible distributions of carries to various groupings of corresponding bits of the operands involved, and the subsequent selection from among the duplicated results in accordance with the correct assumption of the carry input to the respective groups.

The principle of operation of the conditional sum adder is best illustrated by reference to FIG. 1 which discloses two groups of bits, $i$ and $i+1$ representing the corresponding bits of two operands A and B. The representation of FIG. 1 may properly be construed as representing a portion of a complete conditional sum adder. Further, assuming that the A and B operands are N bits long, each operand may be further divided into $k$ groups of $n$ bits each. Of the $k$ groups, only groups $i$ and $i+1$ are disclosed herein, it being not deemed necessary to disclose the complete adder in order to appreciate the theory of operation thereof. It should be further noted that it is not necessary to the successful operation of a conditional sum adder that the numbers of bits $n$ be the same for each group.

Figure 1:
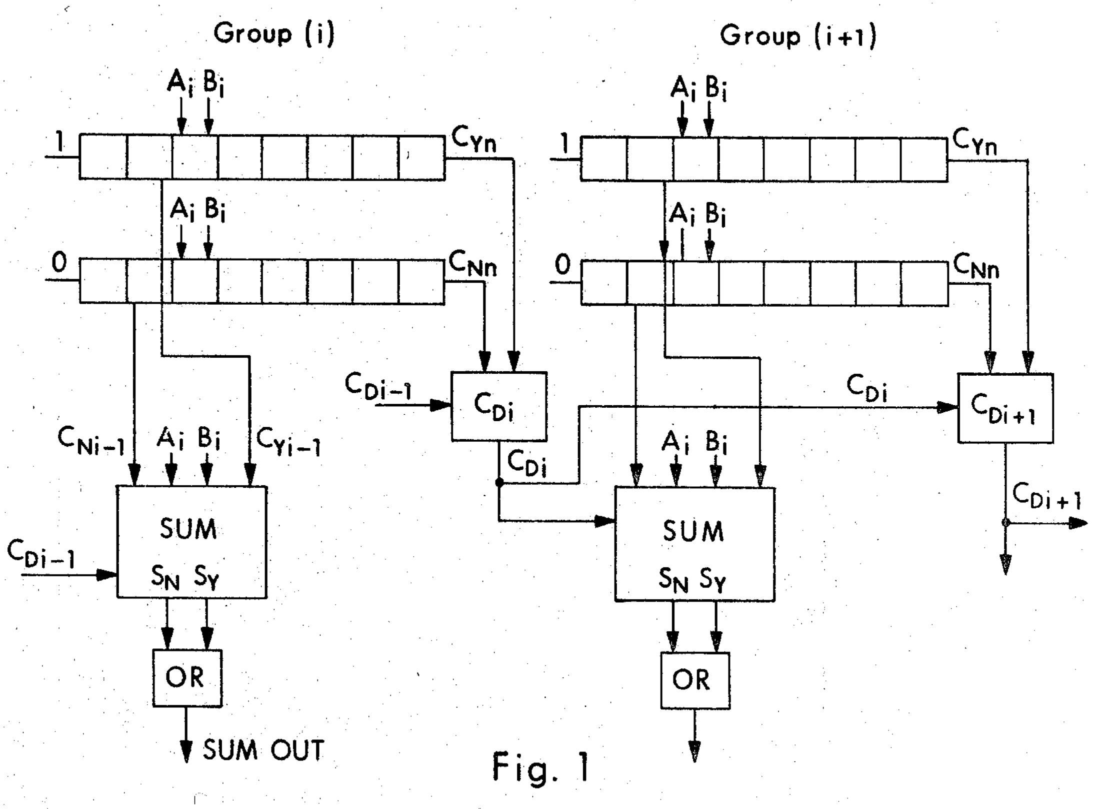
FIG. 1 is a block diagram of a simplified version of a conditional sum adder embodying the principle of the present invention.

For each of the groups $i$ and $i+1$ of FIG. 1, the carry determination portion and a limited portion of the sum circuits are shown in order to generate the two conditional carries and two conditional sums corresponding to a possible one and zero carry input to the group. Having two conditional sums available from each stage of a group, a decision is then made as to which sum is the correct one, which upon selection, becomes the sum output for that particular stage.

The carry determination logic forming the subject of the present invention receives the conditional carry outputs from each group. The conditional carry outputs of group $i$ in FIG. 1 are represented as $C_{Yn}$ and $C_{Nn}$. As indicated above, the conditional carry $C_{Yn}$ represents the carry condition established in the $n^{th}$ stage of a particular group on the assumption that a carry had been propagated into the lower bit stage therefrom from the preceding group. Similarly, the carry condition $C_{Nn}$ represents the carry out of the $n^{th}$ stage on the assumption that no carry had been propagated into the lower order stage thereof from the preceding group.

The form of the carry determination logic arrived at either through straightforward induction or by the method of the Karnaugh map results in the conventional expression.

$$C_{Di}=C_{D(i-1)}\cdot C_{Yin}+C_{Nin}$$

The above representation of the carry determination expression does not lend itself to implementation by conventional tunnel diode circuits while at the same time providing a circuit capable to effecting the expression $C_{Di}$ in one logical time unit.

As indicated above, the conventional approach is to optimize the logical expression of the carry determination function. However, the optimal logical expression does not permit a corresponding optimization at the point of implementation in actual hardware. Accordingly, the approach taken in the present invention is to reexpress the carry determination logical statement in a manner which facilitates its implementation in hardware in an optimal manner. Accordingly, the optimal form of the carry determination expression is as follows:

$$C_{Di}=C_{Yin}(C_{D(i-1)}+C_{Nin})$$

In essence, what is recognized here is the fact that whenever a conditional carry is being propagated out of the $n^{th}$ of the $i^{th}$ group on the assumption that no carry was propagated into the lowest order stage thereof from the preceding group, it is inherent necessity that a carry also be propagated out of the $n^{th}$ stage of the $i^{th}$ group on the assumption that a carry was propagated into the lowermost stage thereof from the preceding group.

The general expression for the sum output of the respective stages of the conditional adder of FIG. 1 may be represented by the two cascaded logical equivalence functions $$(A\nabla B=\overline{A}\,\overline{B}+AB)$$

The corresponding expressions for both conditional sums may be represented as:

$$S_Y=(\overline{A}\nabla\overline{B})\nabla C_Y$$

$$S_N=(\overline{A}\nabla\overline{B})\nabla C_N$$

Combining the first portion of the above expressions for $S_Y$ and $S_N$ enables the complete expression for stage $j$ of group $i$ be given as:

$$S_{ij}=(\overline{A}_{ij}\nabla\overline{B}_{ij})\nabla[C_{Yi(j-1)}\cdot C_{D(i-1)}+C_{Ni(j-1)}\cdot\overline{C}_{D(i-1)}]$$

In the actual implementation, logical equivalence circuits are eliminated from the sum selection path thus enabling the above logical expression to be stated as:

$$S_{ij}=[(\overline{A}_{ij}\nabla\overline{B}_{ij})\nabla C_{Yi(j-1)}]\cdot C_{D(i-1)}+[(\overline{A}_{ij}\nabla\overline{B}_{ij})\nabla C_{Ni(j-1)}]\cdot\overline{C}_{D(i-1)}$$

Figure 2:
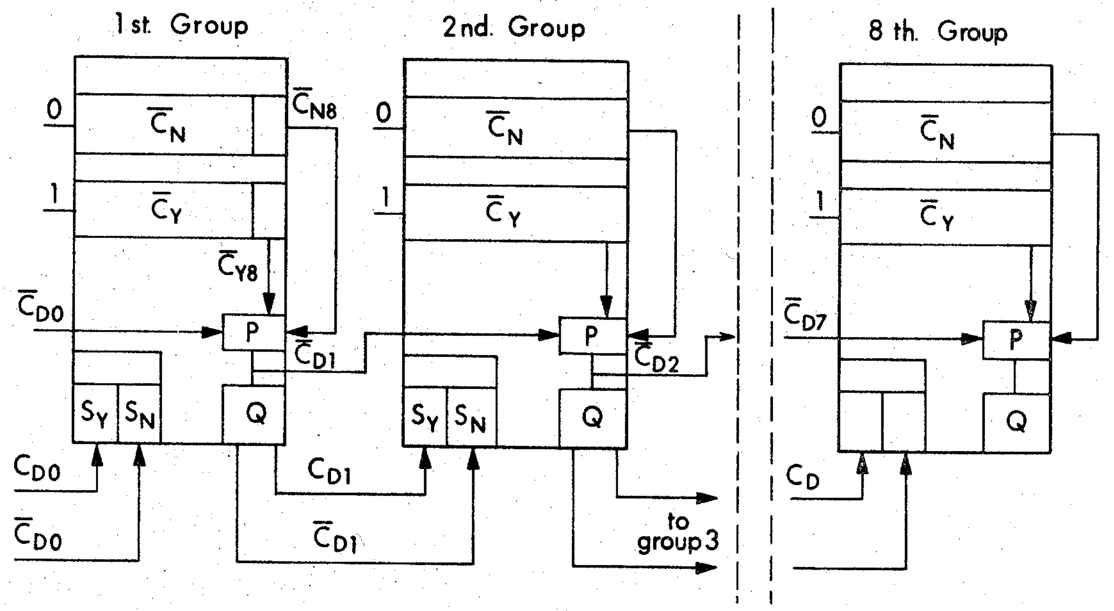
FIG. 2 is a block diagram showing a more complete organization of the adder of FIG. 1.

In the actual implementation of a conditional sum adder constructed in accordance with the principles of the present invention, the bit representations identified in FIG. 1 as groups $i$ and $i$+1 may be considered as portions of two 64 bit operands. As such, each group may comprise eight bits of an operand so that the complete adder will be made up of eight such groups. Referring now to FIG. 2, therein is disclosed in block diagram form three of the eight groups comprising a complete adder. The symmetry of design of each group renders it particularly susceptible to construction via integrated circuitry techniques. This same symmetry makes it unnecessary to duplicate each group of the adder in order to appreciate its logical design and operation.

For speed and circuitry considerations, the input signals to the individual adder stages are represented as the complements of the operand bits. Consequently, it is the complement of the carry determination signal which is propagated to each succeeding group. It should be apparent from the logical organization of the adder of FIGS. 1 and 2 and the description of the former as hereinbefore given, that a carry will be propagated from group to group and that both of the conditional sums and carries generated therein will be dependent upon the carry propagated thereto from a preceding stage. The sum signals are thus exclusively related to the group to which their corresponding operand bits belong. In the interpretation of FIG. 2, the complement of the $C_j$ of the $j^{th}$ stage is generated by a conventional carry circuit in accordance with the generalized equation:

$$\overline{C}_j=\overline{A}_j\overline{B}_j+\overline{A}_j\overline{C}_{j-1}+\overline{B}_j\overline{C}_{j-1}$$

where $A_j$ and $B_j$ are the two operands of the $j^{th}$ stage; $C_{j-1}$ is the carry function of the stage of the next lower binary order; and, $C_j$ is the carry function of the $j^{th}$ stage. The barred symbols represent the complements of the logic variables defined above.

The logical implementation of the interstage carry signal may be of the form disclosed in the above identified Roberts patent. In the further interpretation of FIG. 2, the box P designates the carry determination function, $\overline{C}_{Di}$ which is disclosed more fully below. Member Q represents a conventional amplifier used to strengthen the carry determination signal to be used in the selection of the conditional sums in the next succeeding group. In the implementation of the sum function use may be made of logical equivalence circuits constructed in accordance with the expressions given above. Alternatively, reference may be made to the logical representation of the sum function as is disclosed in the above-mentioned Sklansky reference.

Figure 3:
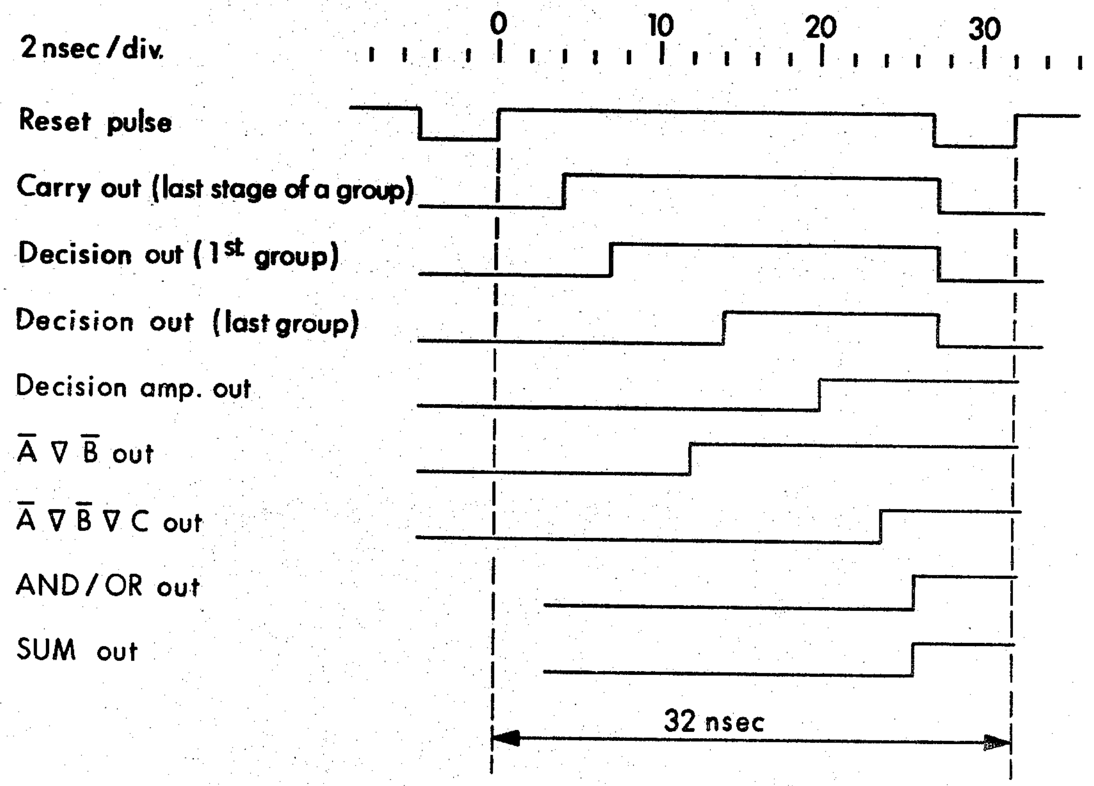
FIG. 3 is a timing diagram for the adder of FIG. 2.

In reviewing the operation of the apparatus embodied in FIG. 2, the generation of conditional sum and carry signals occurs simultaneously in all stages of all groups of the adder. As the conditional carries are propagated to the eighth stage of the first group of the adder, the output signals therefrom are fed to the intergroup carry determination logic of member P which is likewise conditioned by the input signal $\overline{C}_{Do}$. (This latter signal may be initially assumed as being a zero input to the first group.) The carry determination signal is advanced to the corresponding carry determination logic of the second group, as well as being propagated via the amplifier Q to the conditional sum circuitry of group 2. In this manner, the appropriate conditional sum and carry selections are made in the succeeding groups. The timing diagram for the complete 64 bit adder is given in FIG. 3 wherein the time shown represent the worst case design values, with packaging and interconnection parameters taken into consideration.

Figure 4:
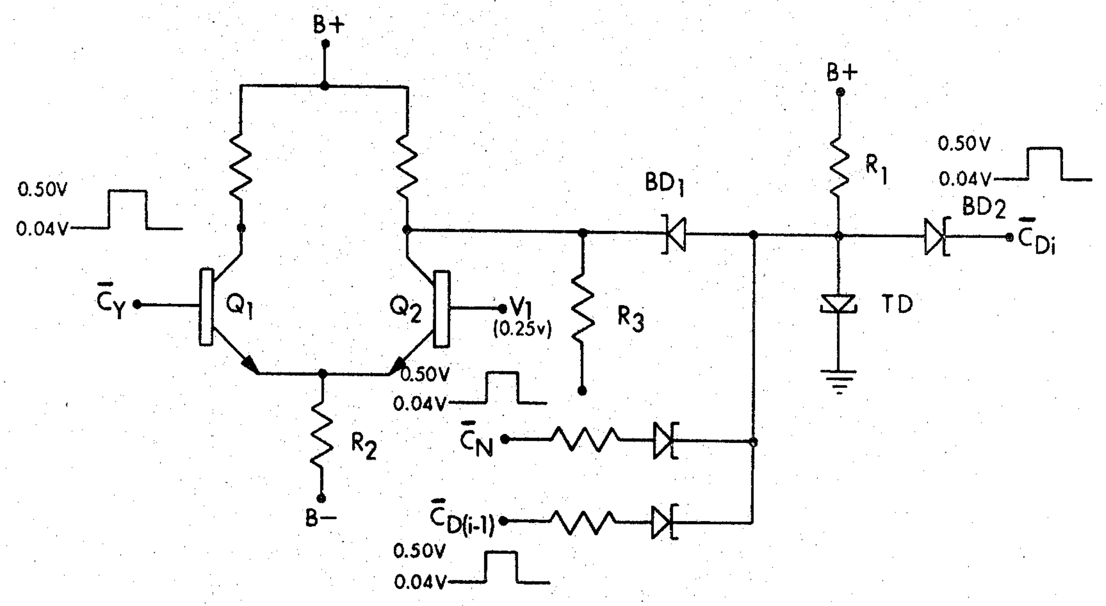
FIG. 4 is a diagram of the circuit used to implement the carry determination function of FIGS. 1 and 2.

Referring now to FIG. 4, therein is disclosed a preferred embodiment of the circuit constituting the carry determination portion of the present invention. As mentioned above, it is the present circuit implementation which gives rise to the unique interpretation of the carry determination function thereby permitting the carry determination operation to be effected in a single logical time cycle. Included in the circuitry of FIG. 4 are a pair of transistors $Q_1$ and $Q_2$ connected as a conventional current switch. In the preferred embodiment of the present invention, transistor $Q_2$ has a fixed reference voltage $V_1$ of 0.25 volts applied thereto. The base of transistor $Q_1$ has tied thereto the input signal $\overline{C}_Y$ corresponding to the signal $C_{Yn}$ in FIG. 1. In the absence of the input signal $\overline{C}_Y$, transistor $Q_2$ is normally conditioned to conduct while transistor $Q_1$ is biased into its cutoff region. Alternatively, when the input signal $\overline{C}_Y$ is true, transistor $Q_1$ conducts while transistor $Q_2$ is cutoff.

Figure 5:
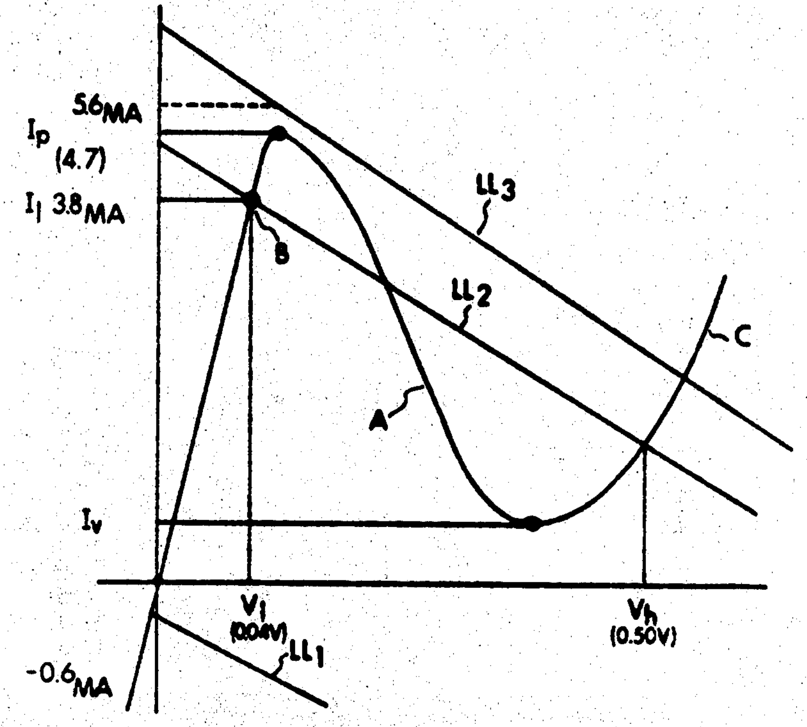
FIG. 5 represents the characteristic curve of a negative resistance device as is utilized in the circuit of FIG. 4.

The circuit of FIG. 4 further includes a tunnel diode TD which has the characteristic operating curve shown in FIG. 5.

Reference to FIG. 5 indicates that the tunnel diode has a peak current $I_P$ of 4.7 milliamps. A biasing source B+ is normally connected through resistor R1 to the input of the tunnel diode TD. In addition, a backward diode $BD_1$ interconnects the input of the tunnel diode TD and the collector junction of the transistor $Q_2$.

The operation of FIG. 4 is such that when the input signal $\overline{C_Y}$ is false, a current flows from the B+ source, through resistor R1 and backward diode $BD_1$ to the collector emitter junction of transistor $Q_2$ and thence resistor R2 to the B− voltage source. A negative voltage is thus established at the common junction of the backward $BD_1$ and the tunnel diode TD, biasing the tunnel diode to a point along the load line LL1 of FIG. 5. Under these conditions a negative (reverse) current of −0.6 milliamps flows through the tunnel diode TD. The negative current contribution flowing through the tunnel diode is such that the latter will not be switched to its high-voltage state by the collective contribution of two or more dependent input signals (i.e. $\overline{C_N}$ or $\overline{C_{D(i-1)}}$) so long as the independent input signal $\overline{C_Y}$ remains false. In this respect the biasing voltage of B+ has a value which is precisely defined relative to the impedance of resistor R1 to maintain the tunnel diode in its first operative state in the absence of the independent input signal $\overline{C_Y}$.

When the input signal $\overline{C_Y}$ becomes true, transistor $Q_1$ becomes conductive, thus raising the voltage at the collector of transistor $Q_2$ sufficiently to back bias the diode $BD_1$ so that the current flow through resistor R1 is routed into the tunnel diode to provide a forward current therethrough. At this time, the tunnel diode is shifted to an operating point on the load line LL2 of FIG. 5. As indicated, the operating point of the tunnel diode settles to the point B to provide a current of 3.8 milliamps through the tunnel diode, and a voltage $V_1$ of approximately 0.04 volts, thereacross.

With the input signal $\overline{C_Y}$ true and the tunnel diode operating at point B, the additional current provided to the tunnel diode by an input signal $\overline{C_N}$ or $\overline{C_{D(i-1)}}$ will be sufficient to cause the tunnel diode to exceed its 4.7 milliamp peak current point, thus causing it to switch to the high voltage portion C of its characteristic curve. Each of the additional signal inputs $\overline{C_N}$ and $\overline{C_{D(i-1)}}$ provides an additional 1.8 milliamp current through the tunnel diode to shift the operating point to a value falling along the load line LL3. Thereafter the removal of the input signals $\overline{C_N}$ and/or $\overline{C_{D(i-1)}}$ permits the operating point of the tunnel diode to shift to a value along the load line LL2, but still in the high voltage portion of its operating curve.

It should be noted that if the input signal $\overline{C_Y}$ is false, the presence of $\overline{C_N}$ and/or $\overline{C_{D(i-1)}}$ will not be sufficient to cause the tunnel diode to switch to its high voltage state. If on the other hand, $\overline{C_Y}$ is true, the presence of either $\overline{C_N}$ or $\overline{C_{D(i-1)}}$ will be sufficient to cause a switching of the tunnel diode to its high voltage state.

The backward diode $BD_1$ and $BD_2$ function to capacitively isolate the input and output capacitance loads from the tunnel diode thus preserving to it, its characteristic operating speed while enabling it to be completely responsive to conditions at the input and output portions of the circuit. Resetting of the tunnel diode may be effected by means of an unconditional reset pulse applied through the resistance R3.

In terms of its function as a circuit for effecting the carry determination operation in the conditional sum adder of FIGS. 1 and 2, the circuit of FIG. 4 will respond by generating an output in the presence of the signal $\overline{C_Y}$ representing a carry out of the $n^{th}$ stage of the $i^{th}$ group on the assumption that a carry was propagated into the low order stage thereof and a signal $\overline{C_{D(i-1)}}$ indicating that a carry was propagated from the *i*-1 group; or, alternatively, that a carry was propagated out of the $i^{th}$ group on the assumption that a carry into the low order bit position thereof did occur as represented by the signal $\overline{C_Y}$, and that a carry was propagated out of the $n^{th}$ stage of the $i^{th}$ group on the assumption that no carry was propagated into the low order stage thereof, the latter condition being represented by the signal $\overline{C_N}$.

It becomes obvious from the explanation of operation of FIG. 4 that the generalized expression to be realized at the output $\overline{C_{Di}}$ of the tunnel diode will be:

$$\overline{C_{Di}}=\overline{C_Y}(\overline{C_N}+\overline{C_{D(i-1)}})$$

where $\overline{C_Y}$ represents the conditioning input to the base of the transistor $Q_1$ and represent the conditioning signals ties in directly to the tunnel diode TD.

$$\overline{C_N} \text{ and } \overline{C_{D(i-1)}}$$

It will be apparent from the above generalized expression that the circuit in FIG. 4 has the ability to serve in a broader capacity than merely for carry determination purposes. This conclusion should be more readily apparent through reference to FIG. 6 which discloses a symmetrical arrangement of the circuitry of FIG. 4 wherein a similar tunnel diode network has been attached to the input portion of the current switch. In this arrangement, the presence of an input signal to the base of transistor $Q_1$ will effect the conditioning of the tunnel diode circuitry $TD_1$ to thereby make it responsive to input signals on either one or both of the conditioning means $Y_1$ and $Y_2$ in manner similar to that explained in the explanation of the operation of FIG. 4. Alternatively, the absence of an input signal to the base of transistor $Q_1$ results in the conditioning of tunnel diode $TD_1'$ which is thereby conditioned for operation in its high voltage state and is switched thereto in response to the presence of one or more of the signals $Z_1$ and $Z_2$. The functional representation of the output signals realized by the circuitry of FIG. 6 may be expressed as:

$$O_1=X\cdot(Y_1+Y_2)$$

$$O'_1=\overline{X}\cdot(Z_1+Z_2)$$

Figure 6:
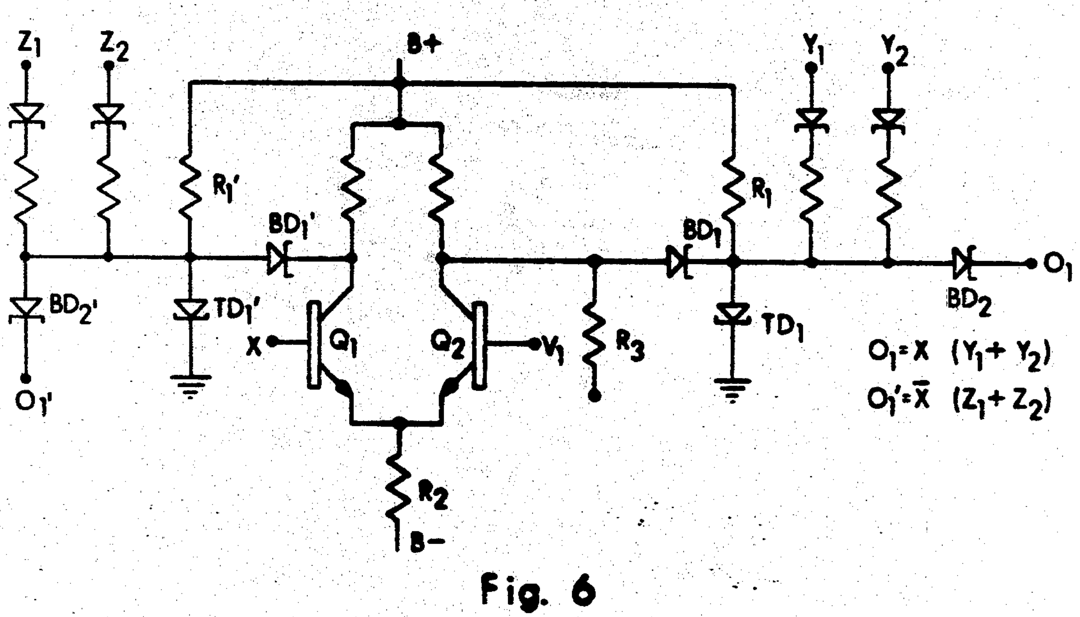
FIGS. 6 and 7 represent modifications to the circuit of FIG. 4.
Figure 7:
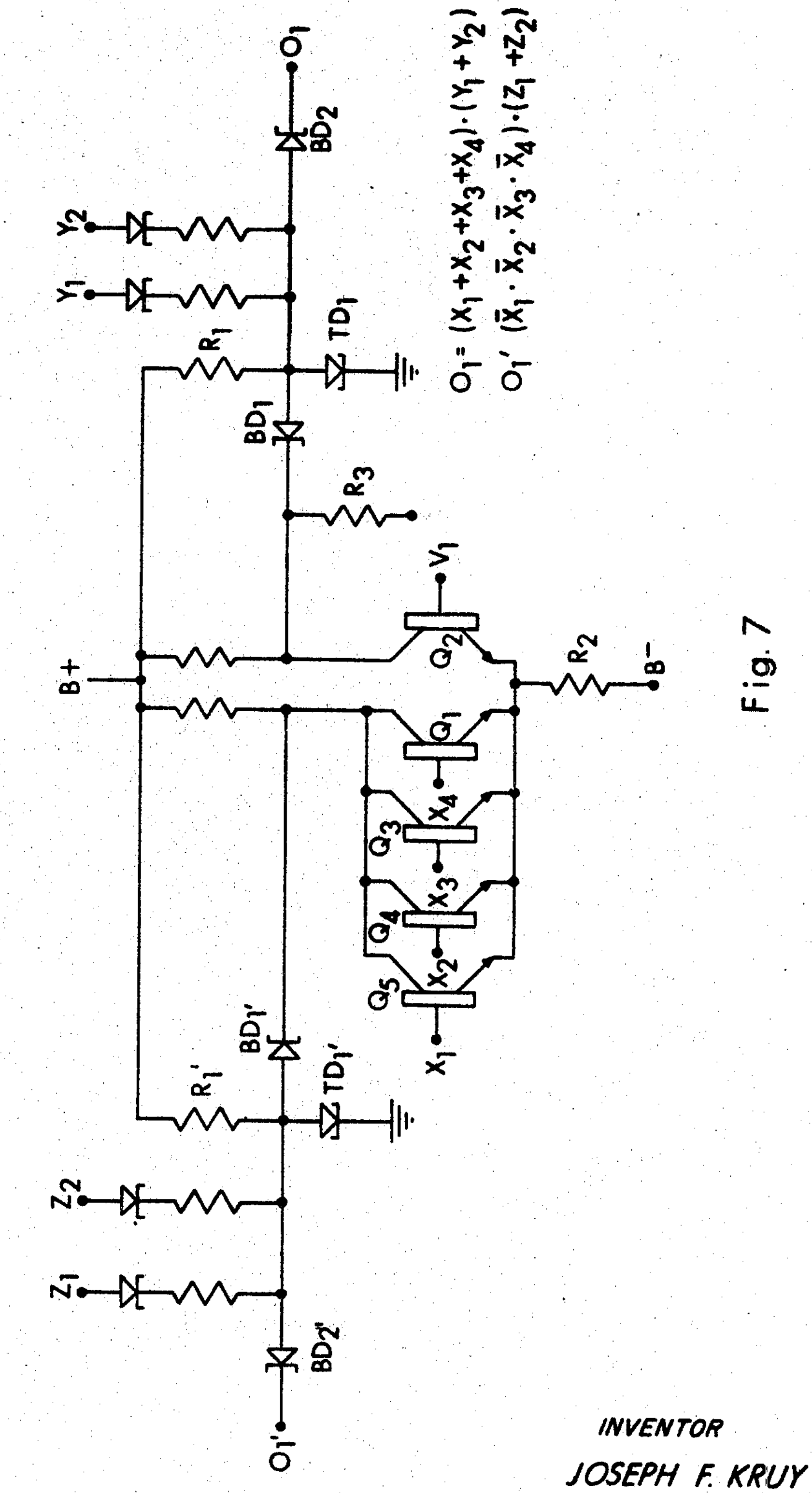

A further expansion of the logical capabilities of the circuitry of FIGS. 4 and 6 will be appreciated by reference to FIG. 7. In this respect, FIG. 7 represents a circuit capable of serving a more universal logical function having the output representations:

$$O_1=(X_1+X_2+X_3+X_4)\cdot(Y_1+Y_2)$$

$$O'_1=(X_1\cdot X_2\cdot X_3\cdot X_4)\cdot(Z_1+Z_2)$$

The above expression is enabled by the combination of the basic symmetrical switching circuit of FIG. 6 with a conventional current mode logic switch having a plurality of asymmetric impedance paths any one of which when activated causes the current to flow therethrough. The patent to Yourke, U.S. Pat. No. 2,964,652 which issued Dec. 13, 1960 is representative of such current mode logic. As indicated in the above logical expression, the energization of any one of the plurality of transistors $Q_1$, $Q_3$, $Q_4$, $Q_5$, will be effective in conditioning the tunnel diode $TD_1$ to enable it to further respond to one or both of the inputs $Y_1$, $Y_2$. Alternatively, the absence of the conditioning signals X1, X2, X3, X4 is effective in conditioning the tunnel diode $TD_1'$ for further actuation to its high voltage state in the presence of either or both of the input signals $Z_1$ and $Z_2$.

While in accordance with the provisions of the statutes, there have been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

I claim:

1. A carry determination circuit for processing groups of bits, said circuit comprising the combination of first switching means for receiving a first carry input, said first switching means being activated in response to a signal from said first carry input representing a carry as being propagated from the high order bit position of said group of bits on the assumption that a carry was propagated into the low order bit position thereof, gate means for receiving a second carry input, representing a carry as being propagated from the high order bit position of said group of bits on the assumption that no carry was propagated into the low order stage thereof and for receiving a carry determination input, representing the success of a carry determination rendered on a group of bits of lower order of significance, and second switching means responsive to said first switching means and said gate for producing a signal at its output representing the condition of said gate whereby said signal being present represents a successful carry determination when said first carry input and either one of said gates inputs are present.

2. An electronic apparatus comprising a current mode logic switching circuit having a first normally conductive flowpath and a second normally nonconductive flowpath, first conditioning means operatively connected to said normally nonconductive flowpath and adapted when activated to switch the state of conduction from said first to said second flowpath; a tunnel diode switching circuit normally biased to one of its two operative states, second conditioning means operatively connected to the input of said tunnel diode switching circuit, said second conditioning means further comprising a plurality of conditioning input leads having signals selectively generated thereon which are normally incapable individually or collectively in switching said tunnel diode circuit to said second operative state; and means operatively connecting said normally conductive flowpath of said current mode logic switching circuit to the input of said tunnel diode switching circuit whereby the switching of the state of conduction from said first to said second flowpath in response to the activation of said first conditioning means is effective in further conditioning said tunnel diode switching circuit so as to cause said tunnel diode switching circuit to switch into its second operative state in response to any one of said plurality of second conditioning signals.

3. The apparatus of claim 2 wherein the biasing means for normally biasing said tunnel diode switching circuit to one of its two operative states includes an impedance member connected to the input of said tunnel diode, said biasing means further comprising a source of biasing potential precisely defined with respect to said impedance means; whereby when said tunnel diode is operative in its first operative state a positive current contribution flows through said impedance means and is joined with a negative current contribution flowing through said tunnel diode, which joint current contributions are thereafter steered into the normally conductive flowpath of said current mode logic switching circuit.

4. An electronic apparatus comprising first switching means having a first normally conductive flowpath and a second normally nonconductive flowpath, first conditioning means operatively connected to said normally nonconductive flowpath and adapted when activated to switch the state of conduction from said first to said second flowpath; second switching means including a device exhibiting negative resistance characteristics and normally biased into a particular one of its two operative states, second conditioning means operatively connected to the input of said second switching means, said second conditioning means further comprising a plurality of conditioning input leads having signals selectively generated thereon which are normally incapable individually or collectively in switching said negative resistance device to the other of its two operative states; means operatively connecting said normally conductive flowpath of said first switching means to the input of said second switching means whereby the switching of the state of conduction from said first to said second flowpath in response to the activation of said first conditioning means is effective in further conditioning said second switching means so as to cause said negative resistance device to switch to said other operative state in response to one or more of said plurality of second conditioning signals.

5. The apparatus of claim 4 including third switching means identical in nature to said second switching means, third conditioning means operatively connected to the input of said third switching means, said third conditioning means further comprising a plurality of conditioning input leads having signals selectively generated thereon and means operatively connecting said normally nonconductive flow path of said first switching means to the input of said third switching means whereby in the absence of a signal to said first conditioning means said last named means is effective in conditioning said third switching means so as to enable said third switching means to switch to said high voltage state in response to a signal on any one of said plurality of conditioning input leads connected thereto.

6. In an electronic apparatus, the combination of a first bistable transistor switching circuit together with at least one tunnel diode switching circuit, said bistable transistor switching circuit further comprising a pair of transistors having first electrodes connected in common, a current source connected to said common electrodes, and biasing means independently connected to second electrodes of said transistor pair, said biasing means rendering one of said pair of transistors normally conductive, means for selectively connecting input signals to the biasing electrode of said normally nonconductive transistor, the presence of said input signal being effective in switching the current flow from said normally conductive transistor to said normally nonconductive transistor; said tunnel diode switching circuit further comprising impedance means connecting said common current biasing source at the input of said tunnel diode to said normally conductive flow path of said transistor switching circuit whereby the current flow from said common current source through said impedance means normally biases said tunnel diode to its low voltage state, a plurality of conditioning leads connected to the input of said tunnel diode, and means for selectively energizing one or more of said conditioning leads to said tunnel diode to thereby switch said tunnel diode to its second operative state only in the presence of a signal switching said normally nonconductive transistors to its conductive state.

7. The apparatus as set forth in claim 5 further including a plurality of transistors connected in parallel with said normally nonconductive flow path of said first switching means, conditioning means connected independently to the base of each of said transistors, and means provided to selectively energize said last-mentioned conditioning means including said first conditioning means to thereby switch said second switching means to its second operative state while initiating the return of said third switching means from its high voltage state to its first operative state.

8. The apparatus of claim 6 wherein said impedance means connecting the input of said tunnel diode to the normally conductive flow path of said bistable switching circuit includes a backward diode to capacitively isolate the tunnel diode switching circuitry from the capacitive load represented by said bistable switching circuitry.

9. In a adder wherein at least two multibit operands being manipulated are segmented into a duplicated plurality of groups, the bits constituting each group being respectively connected to a plurality of stages corresponding to an optimum number of operand bits and wherein an assumed carry is forced into the low order stage of each group of one of said duplicated plurality of groups and a first signal indicative of a carry condition is established in the highest stage of one of said duplicated groups on the assumption that no carry had been propagated into the lower order stage and a second signal indicative of a carry condition is established in the highest stage of the other of said duplicated groups on the assumption that a carry had been propagated into the lower order stage, the improvement in the carry determination means associated with each of said plurality of groups for generating within one logical time unit a carry decision signal which is indicative of the true carry to be propagated therefrom, said last-named means comprising first current conditioning means, said first conditioning means including means for receiving said signal indicative of a true carry decision generated in the immediately preceding one of said plurality of groups, second current conditioning means, said second current conditioning means including means for receiving said first signal indicative of a carry generated at the output of the uppermost stage of the associated one of said plurality of groups on the assumption that no carry was propagated into the lowermost stage thereof, third current conditioning means, said third current conditioning means including means for receiving said second signal indicative of a carry generated at the output of the uppermost stage of the associated one of said plurality of groups on the assumption that a carry was propagated into the lowermost stage thereof, first logical gating means for generating at the output thereof a conditioning signal in response to one or more conditioning inputs connected thereto, said first and second current conditioning means connected as inputs to said first logical gating means, second logical gating means operative to generate an output in response to a predetermined number of current conditioning inputs, said output of said first logical gating means connected as one of said plurality of conditioning inputs to said second logical gating means, said third conducting means connected as a further one of said plurality of conditioning inputs to said second logical gating means whereby a signal indicative of a true carry will be generated within said one logical time unit by said second logical gating means at the output of the carry determination circuit when either said first current conditioning means is energized indicating a carry as having been propagated from the uppermost stage of the associated group on the assumption that no carry was propagated into the lowermost stage thereof, or that said second current conditioning means is energized indicating a carry as having been propagated from the uppermost stage of the associated group on the assumption that no carry was propagated into the lowermost stage thereof and third current conditioning means is energized indicating a carry as having been propagated from the highest most stage of the associated group on the assumption that a carry was propagated into the lowermost stage thereof.